(12) United States Patent
Kuhn et al.

(10) Patent No.: US 11,629,911 B2
(45) Date of Patent: Apr. 18, 2023

(54) TEMPERATURE-CONTROLLABLE CONTAINER WITH VACUUM INSULATION ELEMENTS

(71) Applicant: va-Q-tec AG, Würzburg (DE)

(72) Inventors: Joachim Kuhn, Würzburg (DE); Sebastian Schmidt, Weimar (DE); Thomas Taraschewski, Würzburg (DE)

(73) Assignee: va-Q-tec AG, Würzburg (DE)

( * ) Notice: Subject to any disclaimer, the term of this patent is extended or adjusted under 35 U.S.C. 154(b) by 300 days.

(21) Appl. No.: 16/676,042

(22) Filed: Nov. 6, 2019

(65) Prior Publication Data

US 2020/0141636 A1  May 7, 2020

(51) Int. Cl.
| | | |
|---|---|---|
| F25D 31/00 | (2006.01) | |
| F25B 29/00 | (2006.01) | |
| F25D 11/00 | (2006.01) | |
| B65D 81/18 | (2006.01) | |
| B65D 81/38 | (2006.01) | |

(52) U.S. Cl.
CPC .......... *F25D 31/005* (2013.01); *B65D 81/18* (2013.01); *B65D 81/383* (2013.01); *F25B 29/00* (2013.01); *F25D 11/003* (2013.01)

(58) Field of Classification Search
CPC ........ F25D 31/005; F25D 19/04; F25D 16/00; B65D 81/18; F25B 29/00; Y02B 40/00
See application file for complete search history.

(56) References Cited

U.S. PATENT DOCUMENTS

| | | | |
|---|---|---|---|
| 1,459,280 A * | 6/1923 | Card | F25D 23/062 |
| | | | 217/128 |
| 2,393,245 A * | 1/1946 | Hadsell | F25D 3/00 |
| | | | 220/532 |
| 4,470,264 A | 9/1984 | Morris | |
| 2004/0226309 A1 | 11/2004 | Broussard | |
| 2007/0051734 A1* | 3/2007 | Kuhn | F25D 3/06 |
| | | | 220/592.27 |

(Continued)

FOREIGN PATENT DOCUMENTS

| | | |
|---|---|---|
| DE | 202004016766 U1 | 12/2004 |
| DE | 102006045699 A1 | 4/2007 |

(Continued)

*Primary Examiner* — Lionel Nouketcha
(74) *Attorney, Agent, or Firm* — Mark Terry

(57) ABSTRACT

Temperature-controllable container with vacuum insulation elements and with an interior space, which container comprises a wall with an opening for objects to be placed into the interior space, and a door element closing the opening, wherein transport elements are arranged on an outer surface of the container, which transport elements are designed to enable lifting by means of a transport vehicle, and wherein the container further comprises a temperature control unit which is designed so as to bring the interior space to a predetermined temperature T, wherein the temperature control unit comprises a heating/cooling unit operated via a solar energy device or a heating/cooling unit operated via a power supply network, and wherein a receptacle means for melt-storage elements or sample bodies is arranged in the interior space, which receptacle means is designed so as to position at least two melt-storage elements or sample bodies at a distance from each other.

12 Claims, 5 Drawing Sheets

(56) References Cited

U.S. PATENT DOCUMENTS

| | | | | |
|---|---|---|---|---|
| 2010/0000250 A1* | 1/2010 | Sixt | ................... | B65D 81/3816 |
| | | | | 220/592.2 |
| 2013/0327077 A1* | 12/2013 | Motsenbocker | ...... | F25B 27/005 |
| | | | | 62/324.1 |
| 2014/0265801 A1* | 9/2014 | Klitzing | ............... | A47B 88/437 |
| | | | | 312/334.12 |
| 2015/0143823 A1* | 5/2015 | Slack | ................... | F25D 11/006 |
| | | | | 62/56 |
| 2017/0108261 A1 | 4/2017 | Broussard | | |

FOREIGN PATENT DOCUMENTS

| | | | | |
|---|---|---|---|---|
| EP | 2687979 | A2 | 1/2014 | |
| EP | 2764999 | A2 | 8/2014 | |
| EP | 2876389 | B1 | 1/2018 | |
| JP | 2003065667 | A | 3/2003 | |
| JP | 2010196936 | A | 9/2010 | |
| WO | 9963415 | A1 | 12/1999 | |
| WO | WO-9963415 | A1 * | 12/1999 | ............ F25B 27/002 |

* cited by examiner

TEMPERATURE-CONTROLLABLE CONTAINER WITH VACUUM INSULATION ELEMENTS

CROSS-REFERENCE TO RELATED APPLICATIONS

This patent application claims priority to German utility patent application number 20 2018 106 306.5 filed Nov. 6, 2018 and titled "Temperature-Controllable Container with Vacuum Insulation Elements". The subject matter of patent application number 20 2018 106 306.5 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND

It is well known that vacuum insulation containers exhibit a much better insulating effect compared to insulating foams due to the use of vacuum insulation elements (e.g. vacuum insulation panels—VIP).

Vacuum insulation containers of this generic type are already known in practice, for example in the area of passively temperature-controlled transport of temperature-sensitive goods, such as foodstuffs, beverages, pharmaceutical products or medical products. In the case of temperature-controlled transport, a predetermined temperature range is maintained for the duration of transport. Here, being passively temperature-controlled means the use of additional cooling elements, such as PCM (phase changing material), melt-storage elements or dry ice, which are not connected to an energy source.

In the state of the art, basic patent EP 2 876 389 B1 discloses a vacuum insulation container in the form of a transport container for passively temperature-controlled transport. This transport container has three side wall elements, one ceiling element, one floor element and at least one door element. The door element is mounted so that it can swivel about a vertical axis. In the interior space, rail-like receptacle means are fastened to the side walls, into which the melt-storage elements for transport are inserted.

The disadvantage of passive cooling of these transport containers is that the respective melt-storage elements must be replaced, which aspect limits use for storage regarding storage time, for example. In addition, the use of melt-storage elements limits temperatures that can be achieved during cooling and thus the intended use, for example for cooling of test sample bodies.

SUMMARY

The present invention pertains to temperature-controllable container with vacuum insulation elements according to the independent claim.

It is the object of the invention to provide a temperature-controllable container which overcomes the disadvantages of containers known from the state of the art, and in particular enables permanently active heating or cooling.

The object is attained by a temperature-controlled container according to claim 1. Advantageous aspects of the invention are the subject-matter of the respective subclaims.

The invention encompasses a temperature-controllable container with vacuum insulation elements and with an interior space, which container comprises a wall with an opening for objects to be placed into the interior space and a door element closing the opening. Transport elements are arranged on an outer surface of the container and are designed to enable lifting by means of (the tines) of a transport vehicle. The container further comprises a temperature control unit (e.g. driven by electrical energy or thermal energy) designed so as to bring the interior space to a predetermined temperature T. The temperature control unit provides a container for transport and storage, the interior temperature of which can be controlled via a heating or cooling unit. In this way, low or high temperatures can be continuously maintained in the interior space for long periods of time, which enables application for storage of objects or sample bodies over long periods of time. The vacuum insulation elements in the wall are designed so that the container has a thermal conductivity of less than 6 W/K (for external dimensions of 1432 mm×1490 mm×1580 mm (h) including transport elements). This corresponds to a heat transition coefficient (based on the above exemplary data inclusive of all thermal bridges) of less than 0.45 $W/m^2/K$.

It is advantageous if a receptacle means for melt-storage elements or sample bodies is arranged in the interior space, whereby the receptacle means is designed in such a way that at least two melt-storage elements or sample bodies are arranged at a distance from each other.

According to a preferred aspect of the invention, the driven temperature control unit comprises an electric heating/cooling unit driven by a solar energy device. For example, the solar energy device may be mounted on the container to provide a self-sufficient system suitable for use in remote areas, such as at development aid locations.

Preferably, the solar energy device comprises a solar module (photovoltaic module to convert (solar) light into electrical energy) and a control unit. The solar module preferably has such a size and shape to completely cover the upper surface of the container. The control unit is adapted to store the electrical energy generated by the solar energy module or to provide it to operate the temperature control unit. The solar module can be removed by hand without using tools by means of a detachable attachment to the container.

Advantageously, the control unit comprises a processor unit and an electric accumulator. The processor unit is adapted to charge the electric accumulator when the solar module supplies electrical energy that is not being used to operate the heating/cooling unit at that time. The processor unit cooperates with sensors such that the electricity provided by the solar module and the charging state of the electric accumulator are determined so as to control the charging process.

It is also preferable if the electric heating/cooling unit includes a cooling compressor designed to operate with varying (electrical) energy absorption. For example, a VSC (variable speed compressor) can be used, in which the operating speed and thus the energy absorption are adjusted in accordance with the energy being currently available.

Preferably, the electric heating/cooling unit comprises an evaporator for evaporating a coolant.

DETAILED DESCRIPTION

In accordance with a preferred alternative or additive aspect, the electric temperature control unit comprises a heating/cooling unit operated via the power supply network. The heating/cooling unit operated via the power supply network allows particularly low temperatures to be generated. In addition, the electrical energy supplied by the solar energy system can be supplemented. The power supply network can be fed by conventional energy and additionally by a solar system. In one example, the heating/cooling unit comprises several compressors with a mains connection for power supply via the power supply network.

It is advantageous if a receptacle means for melt-storage elements or sample bodies is disposed in the interior space. This can be a single pallet for storage or a shelving device with several slide-in compartments. The receptacle means for melt-storage elements or sample bodes may include rollers.

The receptacle means for melt-storage elements or sample bodies comprises transport elements designed to enable lifting by means of a transport vehicle.

The receptacle means preferably includes spacers into each of which a corner of a plurality of melt-storage elements or sample bodies can be inserted or which can be placed between two melt-storage elements or sample bodies. The spacer can have a distance D in the range from 10 mm to 20 mm, in particular 15 mm. The spacers can be formed integrally at the melt-storage elements or sample bodies or separately formed at the melt-storage elements or sample bodies.

A preferred aspect is that the receptacle means for melt-storage elements or sample bodies has such a size and shape to completely fill the interior space. In contrast to PCM battery receptacles for transport, as described in EP 2 876 389 B 1, the receptacle means provides a maximum bearing surface for the placement of PCM batteries, e.g. for cooling during transport.

The receptacle means for melt-storage elements or sample bodies preferably has such a size and shape to partially fill the interior space.

The preferred size and shape of the receptacle means for melt-storage elements or sample bodies is such that the interior space is filled with a volume in the range of 50% to 90%, especially 70% to 80%.

The method for cooling or heating a temperature-controlled container comprises the steps of:
(a) providing a temperature-controllable container;
(b) filling the temperature-controllable container;
(c) cooling or heating the temperature-controllable container, wherein the temperature is maintained within a range of +/−0.5° C.

Preferably, step a) comprises providing a temperature-controllable container as described above, and step b) comprises filling with melt-storage elements or sample bodies.

In the following, the invention is explained in more detail using the examples shown in the attached drawings.

Figure 1:
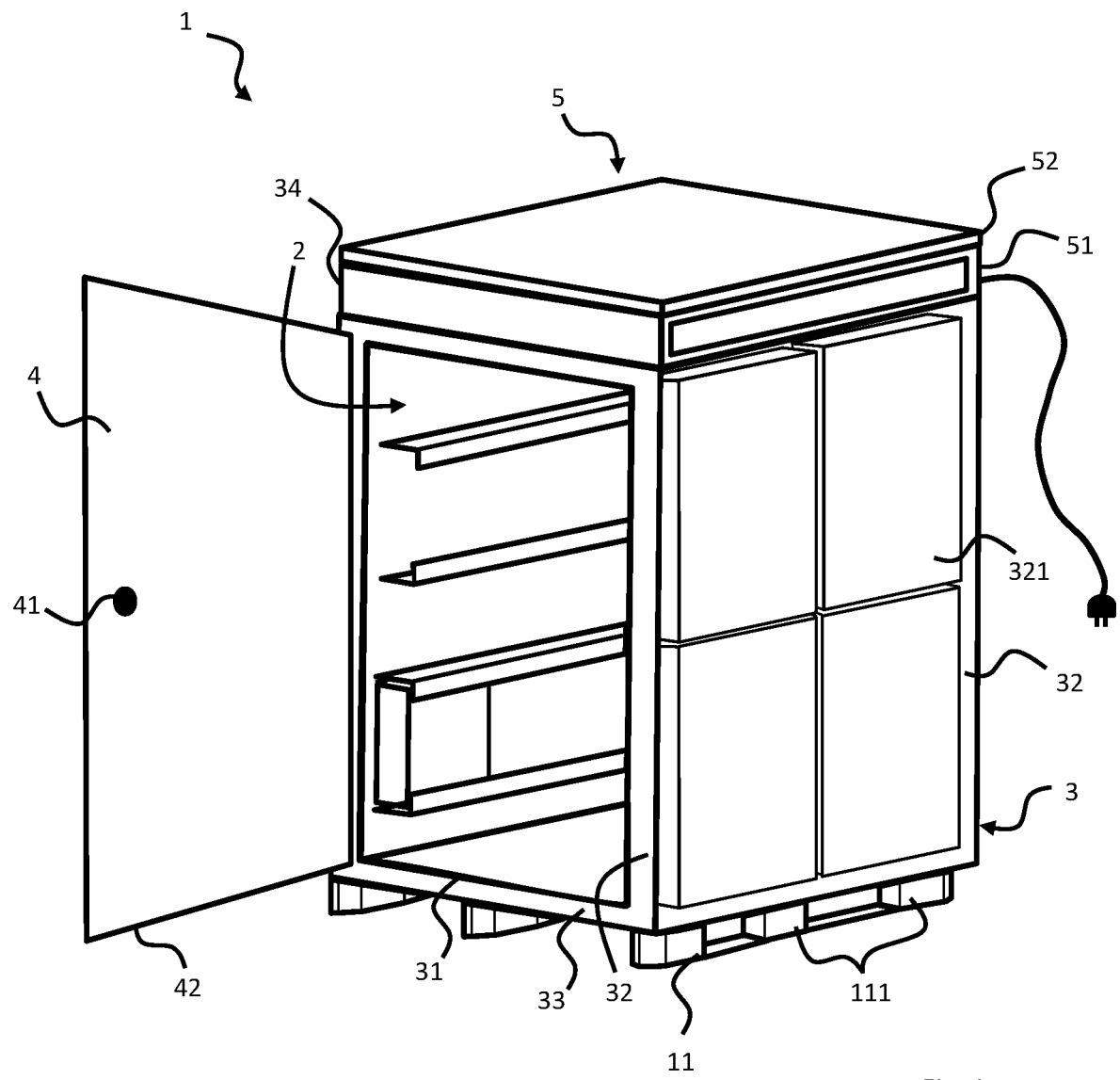
FIG. 1 shows a perspective side view of a temperature-controllable container according to a first exemplary embodiment of the invention with a solar energy device.

FIG. 1 shows a perspective side view of a temperature-controllable container 1 according to a first variant of the invention. In this case, the temperature control unit comprises a solar energy device 5. The electric current generated by the solar energy device 5 is used to operate a heating/cooling unit (not shown).

The shown container 1 comprises a wall 3 of four vertically arranged side parts 32 as well as a floor element 33 closing an interior space (receiving space) downwards and a ceiling part 34 supporting the solar energy device 5 as well as the electrically driven heating/cooling unit (not shown). The right side part 32 is shown open, so that four vacuum insulation panels 321 arranged therein can be seen. Two side parts 32 together with the floor element 33 and the ceiling part 34 form an opening 31 for objects to be placed into the interior space 2. The opening 31 can be closed by a door element 4, which is pivotally arranged on a side part 32, in the manner of a single-leaf door which can be pivoted about a vertical axis.

When the door 4 is open, sample bodies or objects or goods, such as foodstuffs, beverages, pharmaceutical products or medical products, can be inserted through the opening 31 into the interior space 2.

The door 4 closes the opening 31 in an airtight and thermally insulating fashion by means of a sealing element 42, so that a predetermined temperature can be maintained in the interior space 2 over long periods of time. The door 4 can be locked via a locking unit 41 to allow access to the interior space 2, for example exclusively with a key.

For transport and storage, transport elements 11 in the form of nine storage blocks 111 being arranged in a square are provided on the lower surface of the floor element 33 of the container 1, which are connected to each other in the form of a pallet. This arrangement enables the tines of a transport vehicle (forklift) to be engaged from two directions.

On the upper surface, the container 1 also has an electric temperature control unit 5 in the form of an electrically driven heating/cooling unit. The electrically driven heating/cooling unit 5 is designed in accordance with the functionality of a compression refrigeration machine in order to cool down the interior space 2 to a predetermined temperature T. The heating/cooling unit 5 is driven by a solar energy device. The solar energy device comprises a solar module 52 in the form of a unit for generating solar power, which completely covers the upper surface of the container 1, and a control unit 51 arranged below the solar module 52. The control unit 51 has all components arranged in the housing (see FIG. 2) and has ventilation slots for the supply of air for cooling of the electrical units.

Figure 2:
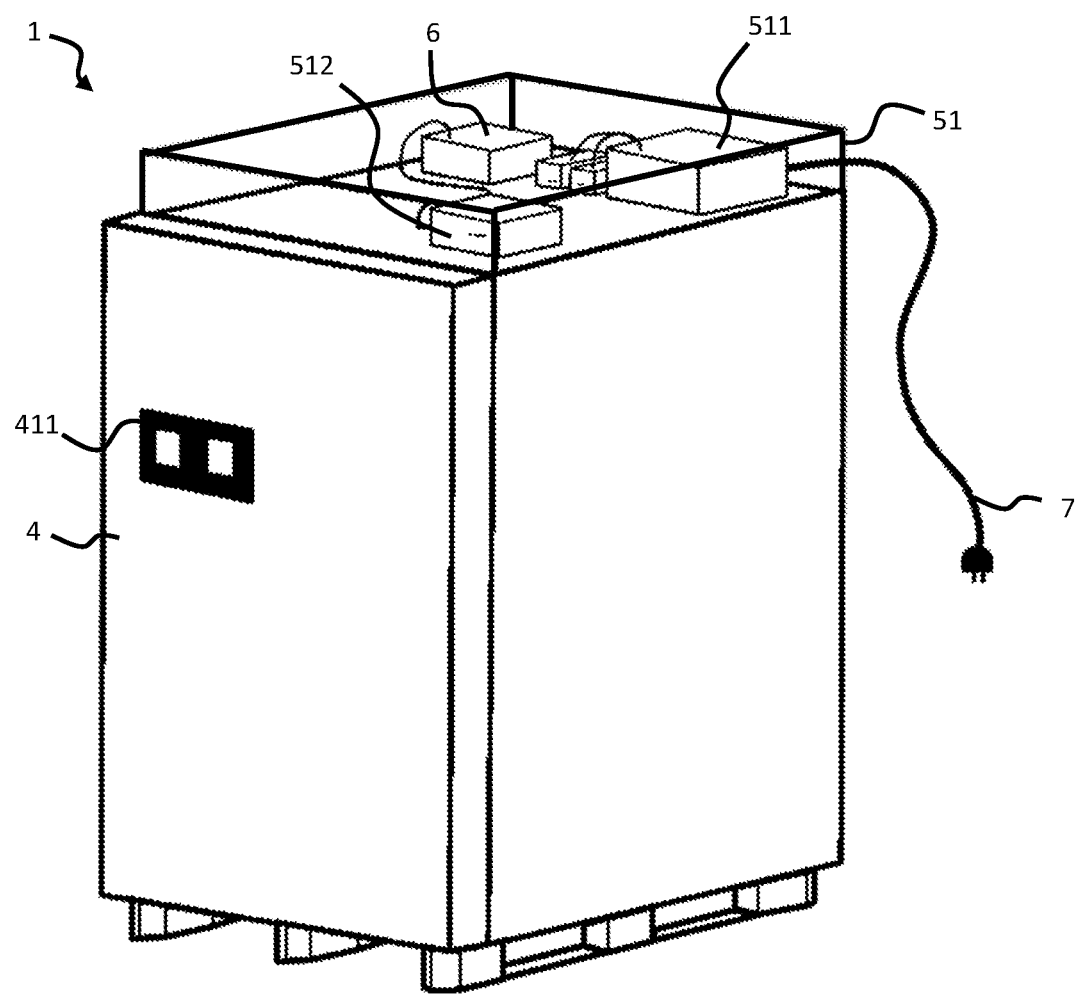
FIG. 2 shows a detailed view of the temperature-controllable container from FIG. 1 in a closed state without solar module.

In FIG. 2 the container 1 of FIG. 1 is shown, whereby the solar module has been removed, so that the control unit 51 of the solar energy device can be seen in partial section. The control unit 51 consists of a processor unit 511 and an electric accumulator 512. Various sensors are connected to the processor unit 511 to determine the electrical energy available in the electric accumulator 512 and due to the solar module. The processor unit 511 is adapted to charge the electric accumulator 512 when the solar module supplies electrical energy which is not currently used to operate the heating/cooling unit 6.

The heating/cooling unit 6 is designed in the form of a compression refrigeration machine and has a cooling compressor which is designed to be operated with varying energy absorption.

In the illustration shown, the door 4 is locked and has a handle 411 to open the door.

In the variant shown, the heating/cooling unit 6, which is driven by the solar energy device, can also be operated via the power supply network and for this purpose has a mains plug 7.

Figure 3:
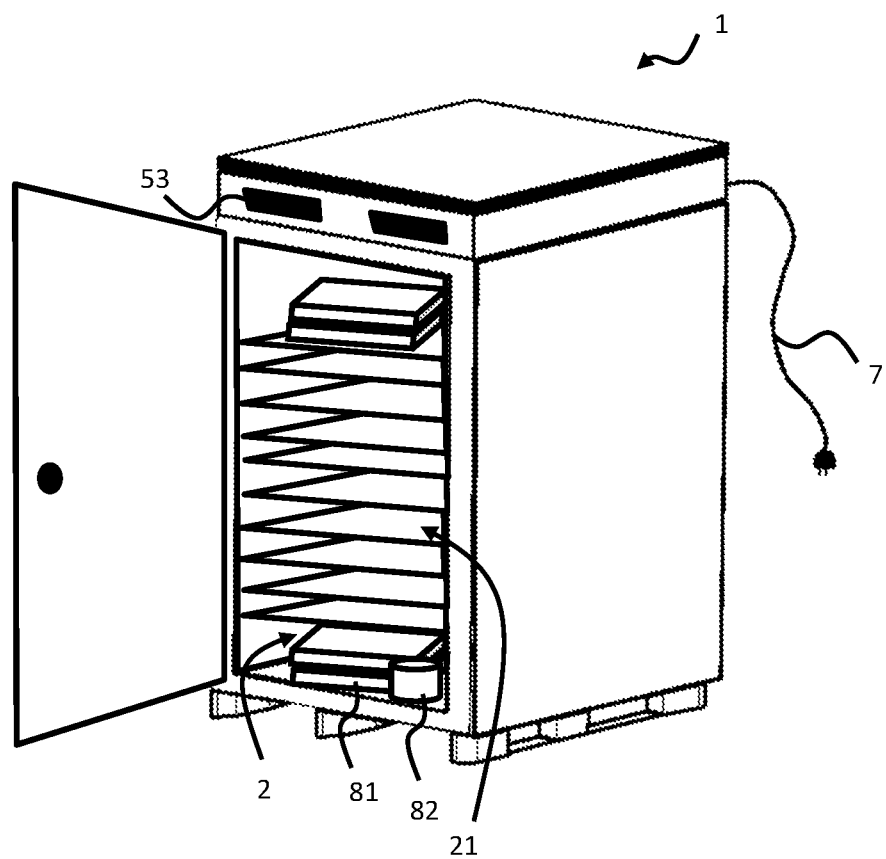
FIG. 3 shows a perspective side view of a temperature-controllable container according to a second exemplary embodiment of the invention with a mains connection.

An alternative variant is shown in FIG. 3, whereby the temperature-controllable container 1 comprises a mains connection 7 for supply via a power supply network.

In this example, the electric heating/cooling unit (see FIG. 2), which is operated exclusively via the power supply network, comprises several compressors with a mains connection 7 for energy supply via the power supply network. Ventilation slots 53 are arranged in the upper area.

It is advantageous if a receptacle means 21 for melt-storage elements 81 or sample bodies 82 is arranged in the interior space 2. The melt-storage elements 81 can be prepared for passively cooled transport. The sample bodies 82 can be stored refrigerated for the performance of tests.

The receptacle means 21 for melt-storage elements or sample bodies 82 has such a size and shape to completely fill the interior space 2. In the example shown, these are shelve compartments that extend over the entire height of the interior space 2.

Figure 4:
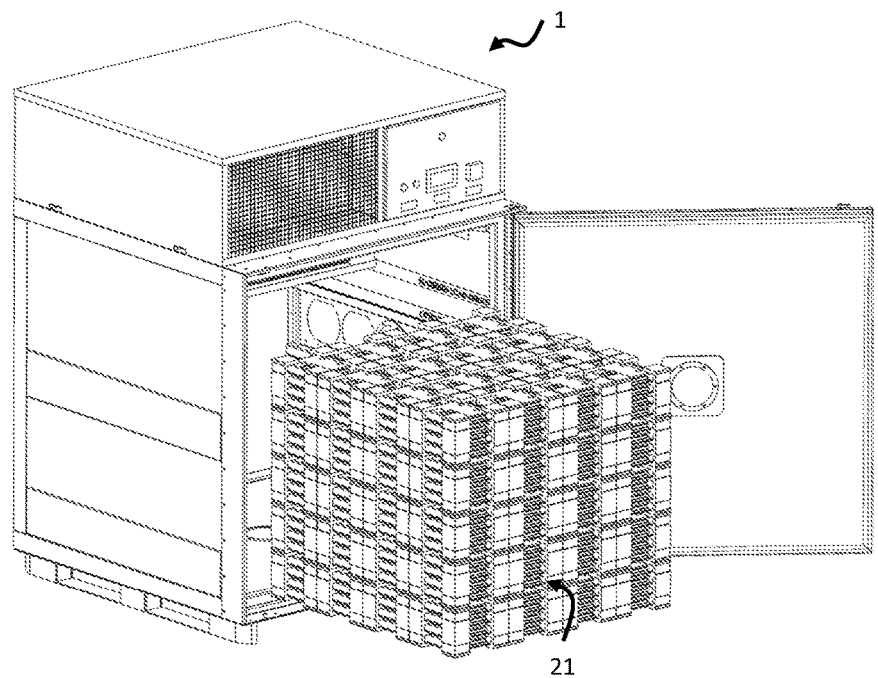
FIG. 4 shows a perspective side view of a temperature-controllable container with an alternative receptacle means in the pushed-out state.
Figure 5:
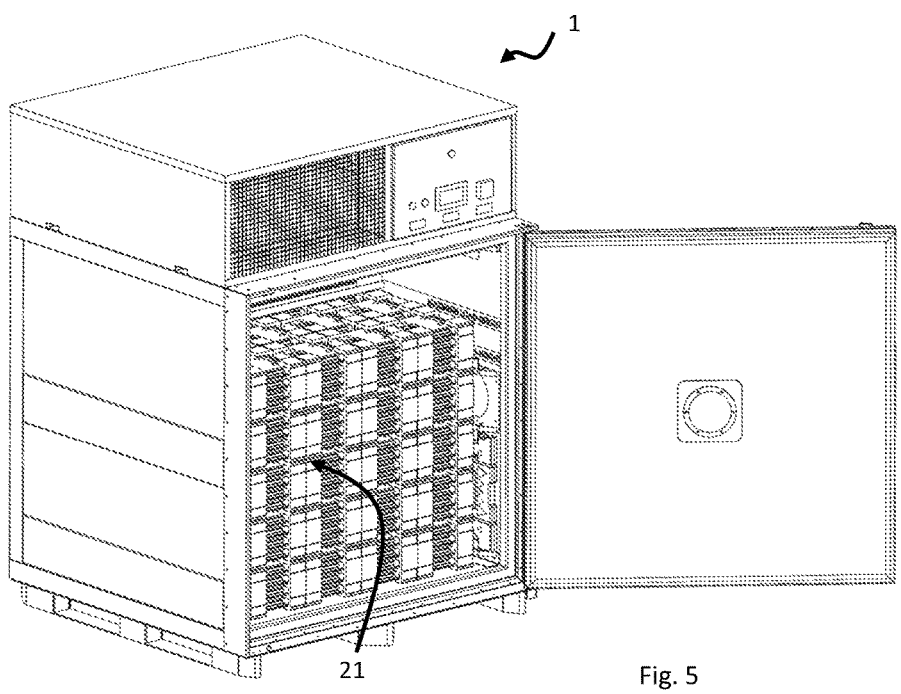
FIG. 5 shows a perspective side view of a temperature-controllable container with an alternative receptacle means in the pushed-in state.
Figure 6:
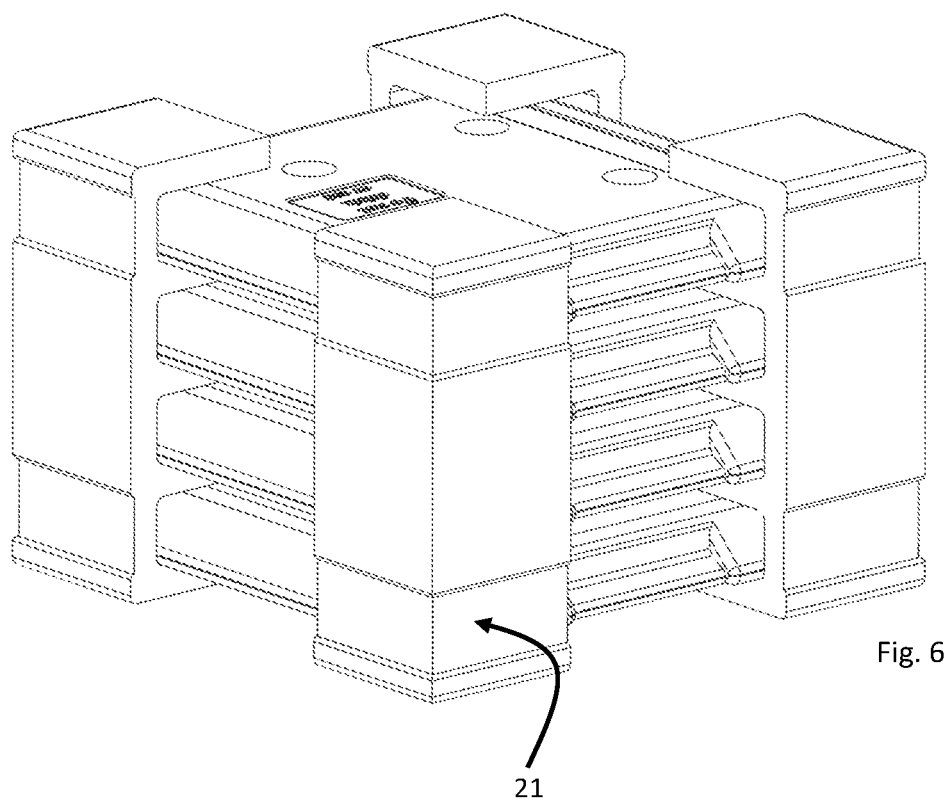
FIG. 6 shows a receptacle means in the form of a spacer.

In FIG. 4 and FIG. 5 a perspective side view of a temperature-controllable container with an alternative receptacle means in the pushed-out respectively pushed-in state is shown. The receptacle means 21 comprises spacers (see detail FIG. 6) into each of which a corner of a plurality of melt-storage elements 81 or sample bodies 82 is insertable or which are each placeable between two melt-storage elements 81 or sample bodies 82. A receptacle means in the form of a spacer does also include a profiled layer to be arranged in between of the melt-storage elements 81 or sample bodies 82.

What is claimed is:

1. A temperature-controllable container with vacuum insulation elements and with an interior space,
which container comprises a wall with an opening for objects to be placed into the interior space, and
a door element closing the opening, wherein transport elements are arranged on an outer surface of the container,
which transport elements are designed to enable lifting by means of a transport vehicle, and
wherein the container further comprises a temperature control unit which is designed so as to bring the interior space to a predetermined temperature T,
wherein the temperature control unit comprises a heating and cooling unit, and
wherein a receptacle means for melt-storage elements or sample bodies is arranged in the interior space, which receptacle means is designed so as to position at least two melt-storage elements or sample bodies at a distance from each other,
wherein the receptacle means comprises spacers into each of which a corner of a plurality of melt-storage elements or sample bodies is insertable or which are each placeable between two melt-storage elements or sample bodies, and wherein the transport elements comprises a plurality of blocks arranged in a square on a lower outer surface of the container, wherein the plurality of blocks are connected to each other in the form of a pallet.

2. The temperature-controllable container of claim 1, wherein the heating and cooling unit is operated via a solar energy device comprising a solar module and a control unit.

3. The temperature-controllable container of claim 2, wherein the control unit comprises a processor unit and an electric accumulator, and wherein the processor unit is adapted to charge the electric accumulator when the solar module supplies electrical energy that is not used to operate the heating and cooling unit at that time.

4. The temperature-controllable container of claim 2, wherein the electric heating and cooling unit comprises a cooling compressor adapted to be operated with varying energy absorption.

5. The temperature-controllable container of claim 2, wherein the electric heating and cooling unit comprises an evaporator for evaporating a coolant.

6. The temperature-controllable container of claim 2, wherein the receptacle means for melt-storage elements or sample bodies comprises transport elements designed to enable lifting by means of a transport vehicle.

7. The temperature-controllable container of claim 2, wherein the receptacle means for melt-storage elements or sample bodies comprise shelve compartments that extend over the entire height of the interior space.

8. The temperature-controllable container of claim 2, wherein the receptacle means for melt-storage elements or sample bodies has such a size and shape to partially fill the interior space.

9. The temperature-controllable container of claim 2, wherein the receptacle means for melt-storage elements or sample bodies has such a size and shape to fill the interior space with a volume in the range of 50% to 90%, in particular 70% to 80%.

10. The temperature-controllable container of claim 2, wherein the wall includes one or more vacuum insulation elements.

11. The temperature-controllable container of claim 10, wherein the vacuum insulation elements are made of pyrogenic silicic acid.

12. The temperature-controllable container of claim 1, wherein the heating/cooling unit heating and cooling unit comprises a plurality of compressors with a mains connection for power supply via a power supply network.

* * * * *